Patented Oct. 19, 1926.

1,604,022

UNITED STATES PATENT OFFICE.

VINTON A. CLARK, OF EDGEWATER, NEW JERSEY.

PROCESS FOR SEPARATING SEEDS.

No Drawing.   Application filed July 6, 1923.   Serial No. 649,958.

This invention relates to the art of seed separation.

More particularly the invention relates to seed separation by the liquid process.

Some of the objects of the present invention are: to separate or select from a lot of seeds those of perfect or nearly perfect internal development by means of liquids or solutions; to select seeds of particular density from a lot of seeds by successively subjecting the seeds to solutions of relatively different densities each of which is less than the maximum specific density of the seeds; to make use of two solutions in the stratification of seeds of a lot of seeds and in which the solutions are of relatively different densities and the density of each of the solutions being different from the probable density of the seeds; that improvement in the process of separating particular seeds from a lot of seeds which involves the use of a chart setting forth the optimum densities respectively of different kinds and cultural races of seeds, names of the seeds and races thereof, specific densities of solutions to be used respectively in the separation of each particular kind of seed of a lot, and the constituents of each solution used; and to separate particular seeds from a lot of seeds according to internal development or germination of the seeds and therefore according to the specific densities of the seeds.

It is known that seeds of highest internal development, that is to say, those seeds which are the best nourished, are the most productive seeds, and are therefore the optimum seeds of a lot of seeds in nearly all cases. These optimum seeds have a fixed and determinable specific density above which the cultural quality or germination of the seeds falls with comparative increase of specific density. In other words, the fixed and determinable density, which is physiologically constant, and within which the cultural qualities of the variety are embodied in their highest development. They define an optimum in the specific density distribution curve above which cultural qualities including germination of the seeds decreases progressively with departure from said optimum. For instance, the maximum specific density of a lot of wrinkled garden peas is 1.31 and range downward therefrom with optimum at 1.28. By subjecting the peas to or by immersing them in a liquid or solution of a density different from the maximum density of the peas, some will float and others will sink according to specific density of the seeds. The specific density of the liquid or solution being known and the maximum specific density of the seeds being known it is easy to find in the process of separation of the seeds in the liquid or solution those seeds of specific density and quality with respect to germination or internal development thereof. It follows therefore that it is possible to separate a lot of seeds according to specific densities thereof for the obtainment of seeds of highest internal development, and those of greater and lesser internal development.

By using two solutions of suitable different specific densities any section or stratification of seeds may be taken out of the lot of seeds as distributed. In most but not all cases said section or stratification will include optimum seeds.

The liquid or solution used has a specific density which is in accordance with the particular kind of seed to be separated. For seeds denser than water, a solution of nitrate of soda in water is used. For seeds less dense than water, linseed oil (specific density of linseed oil is 0.94) is mixed with carbon bisulphide for the range between 0.94 and 1.00; or gasoline may be used instead of linseed oil (specific density of gasoline is 0.70) for the range below 0.94. In most cases of separation according to the present process two solutions are used as follows:

Immerse the lot of seeds to be separated in the less dense solution, that is to say, in a solution whose specific density is less than either the maximum specific density or probable density of the lot of seeds. Then discard the floating seeds. Then transfer the heavy or sunken seeds to a denser solution, that is to say, a solution whose specific density is greater than the maximum specific density or probable density of the seeds first mentioned and greater than the density of the first mentioned solution. Then collect the floating seeds which will be the optimum seeds, which are washed and spread out thinly to dry. The sunken seeds immersed in the last mentioned solution are discarded. If a water solution is used the seeds selected are washed in fresh water, whereas, if an oil solution is used, the selected seeds are washed in gasoline. Germination of the seeds is not lessened for one year at least according to this process.

In the case of peas mentioned hereinbefore, solutions are made up to 1.27 and 1.29, and are used in the separating process. For optimum seeds those floating near the top are collected from the last or second solution. Such seeds are the highest intensive cultures and are used for plant breeding and so forth. For general crop peas for the market a single separation is made at 1.28.

From the foregoing it will be mainfest that precise selections of seeds of optimum or of any desired degree or range of internal development and nutrition according to the specific densities thereof respectively may be made, and takes into account the inferior seeds above optimum, which latter seeds may be eliminated.

What is claimed is:

The process of separating and selecting seeds of the highest interior development from inferior seeds, when said seeds are of a greater density than water and which consists of immersing the seeds in a solution of nitrate of soda and water, and when the seeds are of a less density than water then immersing the seeds in a solution of linseed oil and carbon bisulphide and thence washing the selected seeds in water to remove the solution therefrom.

In testimony whereof I hereby affix my signature.

VINTON A. CLARK.